(Model.)

J. B. DEEDS.
NUT LOCK.

No. 264,933. Patented Sept. 26, 1882.

Witnesses.
A. Ruppert.
J. O. McCleary,

Inventor.
John B. Deeds
by O. E. Duff
Atty.

UNITED STATES PATENT OFFICE.

JOHN B. DEEDS, OF TERRE HAUTE, INDIANA, ASSIGNOR OF ONE-HALF TO WILLIAM MACK, OF SAME PLACE.

NUT-LOCK.

SPECIFICATION forming part of Letters Patent No. 264,933, dated September 26, 1882.

Application filed July 28, 1882. (Model.)

*To all whom it may concern:*

Be it known that I, JOHN B. DEEDS, a citizen of the United States, and resident of Terre Haute, in the county of Vigo and State of Indiana, have invented a new and valuable Improvement in Nut-Locks; and I do hereby declare that the following is a full, clear, and exact description of the construction and operation of the same, reference being had to the annexed drawings, making a part of this specification, and to the letters and figures of reference marked thereon.

This invention relates to the class of inventions known as "nut-locks."

The object of this invention is to prevent the nuts on bolts from jarring off by locking the nut to the bolt in such manner as to prevent their unscrewing when the bolts are subjected to any unusual or violent action, such as is the case with railroad fish-plates, bridges, and working parts of machinery.

To this end the invention consists in an improved nut, and the combination of the improved nut with a threaded bolt.

To more particularly illustrate my invention, I will refer to the accompanying drawings.

The same letters denote like parts wherever they occur.

Figure 1:
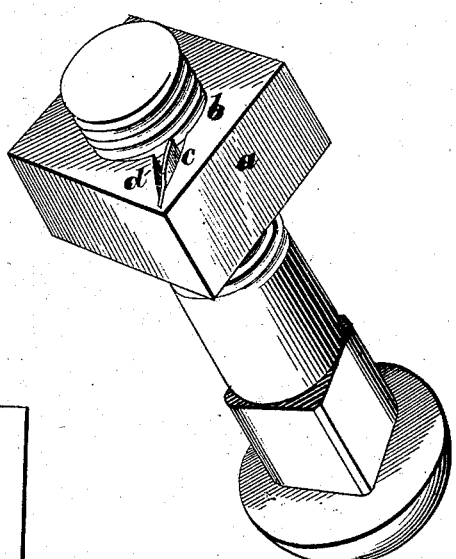
Figure 4:
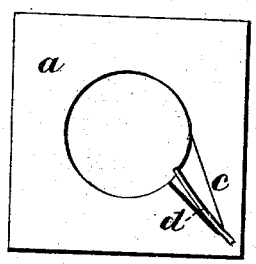
Figure 2:
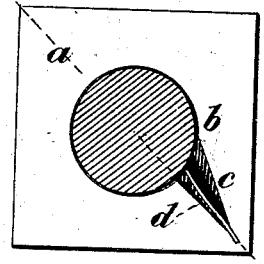
Figure 3:
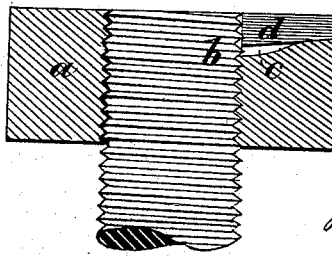

Figure 1 represents a perspective view of a bolt with my improved nut. Fig. 2 is a view of the face of the nut and the end of a bolt screwed into the nut. Fig. 3 shows a transverse section of Fig. 2, and Fig. 4 is a view of the nut detached.

The letter *a* designates the nut, and *b* a bolt screwed therein. *c* is a V-shaped angular recess extending, say, one-fourth (¼) of an inch into the face of the nut. One wall of the recess is nearly tangential with the circumference of the bore of the nut and the other nearly on a right line through its center, the two walls terminating at one corner of the nut. *d* is a straight spring-brace located in the recess *c*, and arranged in line with a chord of the bore of the nut, which is slightly shorter than the diameter of the bore, and is at a small angle with that diameter, as appears clearly in Fig. 4. It will be seen that the spring-brace is at an angle with a tangent to the circumference of the bore of the nut. One end of the spring-brace is secured to the nut, in this instance by hammering the walls of the recess against the sides of the brace, and the end of the brace is free and projects into the bore of the nut beyond the threads of the nut when in its normal position, as appears in Fig. 4, and when in its locking position, as appears in the other figures.

The principle upon which my nut-lock is constructed is well known—that is, a straight brace will stand a greater pressure than a bent prop or brace would. Hence when I throw the strain on a straight line or chord of a circle oblique to its diameter I produce a leverage against the strain corresponding to the distance and angle of the chord of the arc in respect to the diameter of the circle. The brace is on a plane oblique to a plane through the axis of the bolt. The brace having a direction oblique to the motion of the nut turning on the bolt brings it in contact with the thread of the bolt on a line at one side of a plane of the axis of the bolt, so that when the nut is turned backward the brace-lock bites the thread of the bolt in such manner as to throw the entire strain on a direct line with the spring. Thus the greater the strain the greater will be the bite on the threads, so that the spring-brace produces the result which a straight incline prop or brace would effect against a perpendicular standard. In this way the nut cannot turn backward until a slice of the thread is forced off.

The nut is made as follows: It is first punched, the angular recess being formed at the same time. The straight spring is then inserted, and the walls of the recess are closed or hammered together on the spring, which rigidly holds the spring in position. The nut is then screw-threaded, when it is ready for use.

The operation is as follows: When the nut is screwed on the bolt the spring-brace is sprung aside and slips over the edges of the thread until the nut is brought to place. Whenever the nut tends to screw back on the bolt the spring-brace bites into the edge of the bolt-thread and will not slip on the thread, and receives the strain directly or nearly in line with its length. The brace may be set at any angle with the diameter of the nut or bolt far enough from a tangential position to enable it to bite the bolt-thread with a holding-bite. The location of the recess in the face of the nut enables it to be made easily and the spring-brace to be easily secured in it, and provides a readily-accessible aperture for the insertion of any suitable instrument to force the spring-brace away from the bolt-thread and into the nut. The V shape of the recess is one practically made with ease, and affords a narrow space at its rear for the insertion and securing of the spring-brace, and permits play of the free end of the brace within its walls, and may sustain the brace when sprung in either direction. One of the objects of making the recess wider at the inner end is to permit the free end of the spring-brace to be thus forced away from the bolt and into the nut, so that the nut can be unscrewed off the bolt.

It is obvious that the spring may be suitably fastened by other means; but the means shown and described is preferred. Thus a cheap, simple, and effective nut-lock is produced, easily made, and applicable to any-sized bolts in general use.

I am aware that a nut with a recess in its face and a curved spring secured in the recess by spurs formed on it or by compression of its walls, in combination with a grooved bolt, is old; but in such known combination the spring is set at such an angle to the axis of the nut and bolt that it will not bite the edge of the bolt-thread, but must slip over the bolt-thread and lodge in the longitudinal grooves in the bolt. Such a nut and spring will not operate as mine does, and requires a specially-constructed bolt, while my nut and spring work on an ordinary bolt or on a grooved bolt. I am also aware that a nut having an aperture through it and spring-pawl with a shank in said aperture and a head projecting above the face of the nut and thus biting the bolt-threads is old; but while the latter of these constructions operates on the biting principle the arrangement is such as to give torsional instead of direct strain on the pawl, and is liable to be accidentally unlocked, owing to the exposed position of the pawl. These constructions I do not claim.

What I claim as new, and desire to secure by Letters Patent, is—

1. A nut having in its face a recess communicating with the bore of the nut, and a spring-brace rigidly secured to the nut in the recess, and having a free end projecting into the bore of the nut, the brace being set at such an angle to the axis of the nut that it will be sprung aside and slip over the threads of a bolt when the nut is screwed on a bolt, and will bite the threads of a bolt and prevent the nut from unscrewing, as and for the purpose set forth.

2. The combination of a nut having in its face a recess communicating with the bore of the nut, a spring-brace in the recess and rigidly secured to the nut, and having a free end projecting into the bore of the nut, and a threaded bolt, the construction and arrangement of the recess and brace with respect to the bolt being such that when the nut is screwed on the brace springs aside and slips over the thread of the bolt, and that the brace will bite the threads of the bolt and prevent it from unscrewing, as and for the purpose set forth.

In testimony that I claim the above I have hereunto subscribed my name in the presence of two witnesses.

JOHN B. DEEDS.

Witnesses:
 FRED A. ROSS,
 N. G. BUFF.